US011846042B2

United States Patent
Madou et al.

(10) Patent No.: US 11,846,042 B2
(45) Date of Patent: Dec. 19, 2023

(54) SYSTEMS AND METHODS FOR PRODUCING CARBON NANOSTRUCTURES AND ULTRATHIN ALIGNED CARBON WIRES WITH MULTILAYER TURBOSTRATIC GRAPHENE STRUCTURE

(71) Applicant: The Regents of the University of California, Oakland, CA (US)

(72) Inventors: Marc Madou, Irvine, CA (US); Jufeng Deng, Irvine, CA (US); Alexander Hwu, Irvine, CA (US); Xingxu Yan, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 262 days.

(21) Appl. No.: 16/915,339

(22) Filed: Jun. 29, 2020

(65) Prior Publication Data

US 2020/0407880 A1    Dec. 31, 2020

Related U.S. Application Data

(60) Provisional application No. 62/868,559, filed on Jun. 28, 2019.

(51) Int. Cl.
*B29C 48/14*      (2019.01)
*D01D 5/00*      (2006.01)
(Continued)

(52) U.S. Cl.
CPC ........... *D01D 5/0076* (2013.01); *B29C 48/05* (2019.02); *B29C 48/142* (2019.02); *D01F 9/328* (2013.01)

(58) Field of Classification Search
CPC .... D01D 5/0076; B29C 48/05; B29C 48/142; D01F 9/328; B05B 5/025; B05B 5/057;
(Continued)

(56) References Cited

U.S. PATENT DOCUMENTS 8,586,148 B2 * 11/2013 Bisht .................... D04H 1/728
                                                                                                              427/458
9,895,706 B2 *  2/2018 Velásquez-García ........................ B05D 1/007
(Continued)

*Primary Examiner* — Galen H Hauth
*Assistant Examiner* — Shibin Liang
(74) *Attorney, Agent, or Firm* — John Teresinski, Esq.; Stites & Harbison, PLLC

(57) ABSTRACT

Systems and methods are provided for fabricating carbon nanostructures by low voltage near-field electromechanical spinning (LV-NFEMS). Processes described herein can produce ~2-5 nm carbon nanowires with ultrahigh electrical conductivity using top-down and controlled reductive techniques from a polymer. Configurations are also provided to allow for deposition control and fiber elongation/alignment. One embodiment uses a low voltage near-field electromechanical spinning process to produce a polymer fiber from a polymer solution. Another embodiment of the method uses pyrolysis to convert the produced polymer fiber into a ~2-5 nm carbon nanowire. System configurations provide advancements in polymer droplet control and control of a sustained jet of polymer solution with the use low voltages. Systems and processes described herein can include use of an array of polymer precursor nanofibers suspended onto a silicon substrate and converted to carbon nanowires. In another embodiment, ultra-thin carbon fibers can be integrated onto a carbon electrode scaffold.

18 Claims, 13 Drawing Sheets

(51) Int. Cl.
*B29C 48/05* (2019.01)
*D01F 9/32* (2006.01)

(58) Field of Classification Search
CPC .. D04H 5/00; B05D 1/04; B05D 1/40; H01M 4/366
See application file for complete search history.

(56) References Cited

U.S. PATENT DOCUMENTS

2008/0160856 A1* 7/2008 Chen .................. D04H 1/43838
  442/341
2017/0137970 A1* 5/2017 Pourdeyhimi ......... D04H 1/732
2018/0202073 A1* 7/2018 Sakamoto ................ D01D 4/04

* cited by examiner

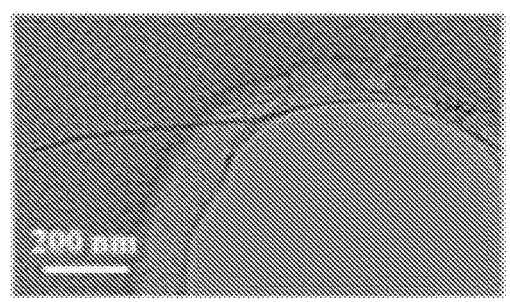
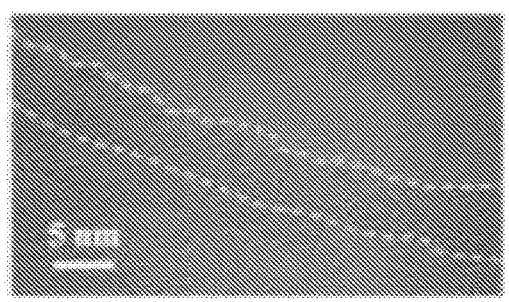
*FIG. 8A*  *FIG. 8B*
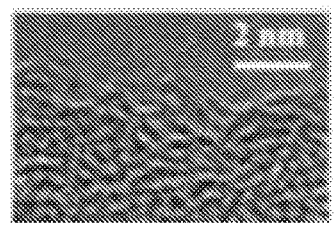
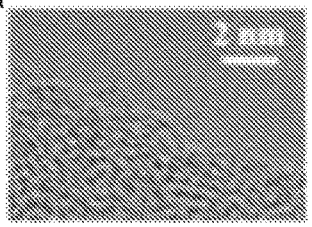
*FIG. 8C*  *FIG. 8D*  *FIG. 8E*

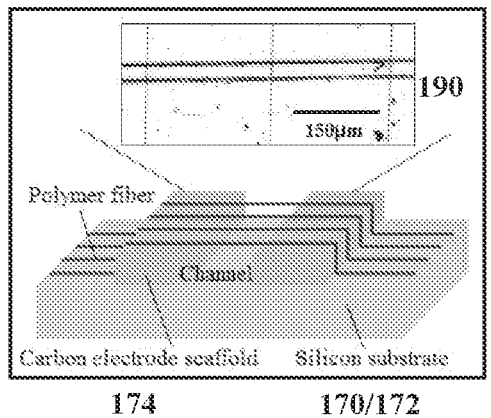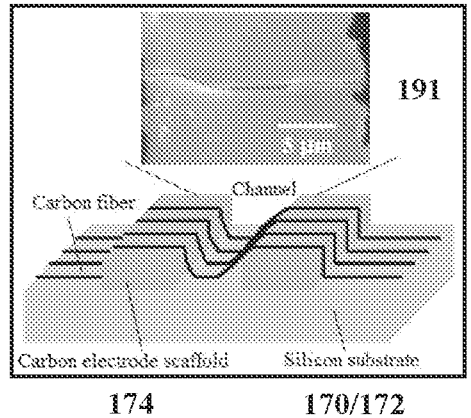
*FIG. 9A*  *FIG. 9B*
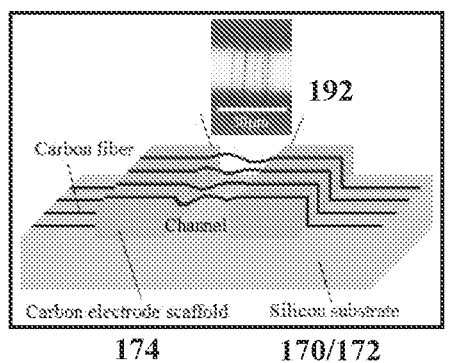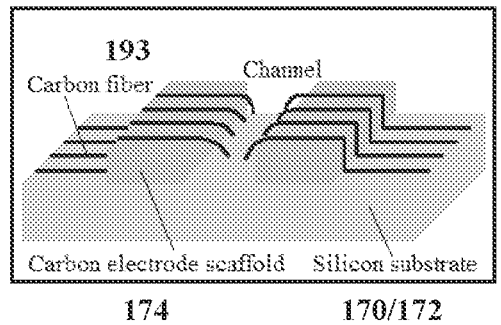
*FIG. 9C*  *FIG. 9D*

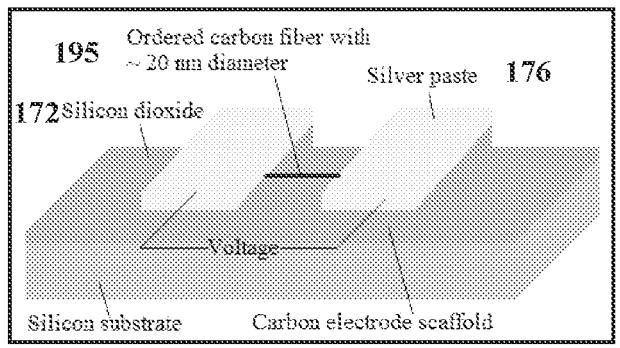 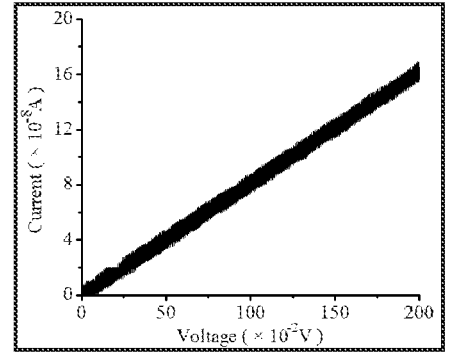
*FIG. 10A*        *FIG. 10B*
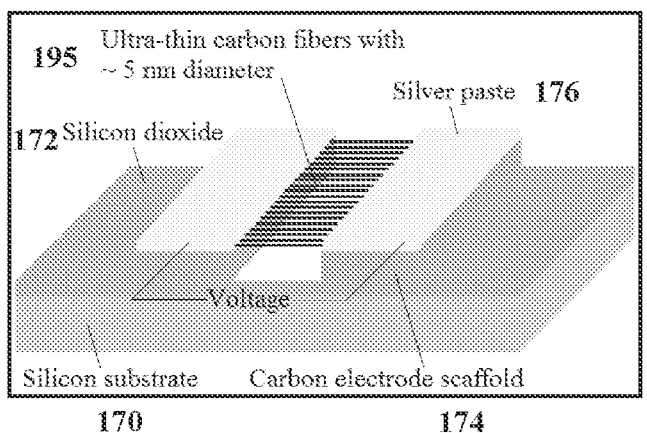 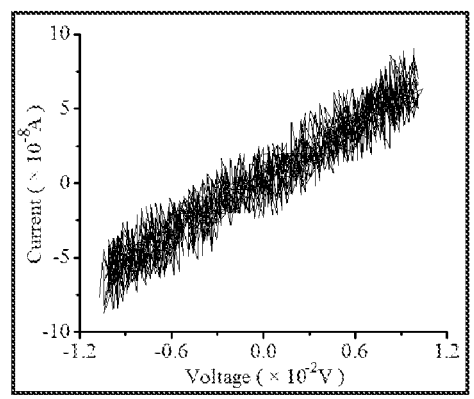
*FIG. 10C*        *FIG. 10D*

SYSTEMS AND METHODS FOR PRODUCING CARBON NANOSTRUCTURES AND ULTRATHIN ALIGNED CARBON WIRES WITH MULTILAYER TURBOSTRATIC GRAPHENE STRUCTURE

CROSS REFERENCE TO RELATED APPLICATION

This application claims priority to U.S. Provisional Application No. 62/868,559 titled ULTRATHIN ALIGNED CARBON WIRES WITH MULTILAYER TURBOSTRATIC GRAPHENE STRUCTURE filed on Jun. 28, 2019, the content of which is expressly incorporated by reference in its entirety.

FIELD

The present disclosure generally relates to systems, methods, and processes to fabricate nanostructures including nanofibers and turbostratic graphene microstructures.

BACKGROUND

Integration and fabrication of items smaller than 30 nm is becoming one of the foremost challenges for technological advancements in our current era. Moore's law proposes that the number of transistors on integrated circuits doubles every two years; however, we are facing a plateau towards further miniaturization due to limitations of lithography-only fabrication techniques of semiconductor manufacturing. The simplified lithography process is as follows: semiconductor fabrication patterning a spun-coat photopolymer, depositing metals or insulation in the pattern, removing undesired or excess materials, and repeating. This process is limited to the wavelength of light used for the mask exposure, making it extremely challenging to fabricate three-dimensional structures less than 30 naonmeter (nm).

In two-dimensional (2D) space, the superior properties of graphene have sparked a wave of research interest into some of graphene's vaunted properties such as ballistic transport, the quantum Hall effect, and a size-dependent band gap. 2D single layer graphene sheets (SLG) come with extraordinary properties, but when left to themselves, graphene sheets stack into multilayer graphene (MLG). Multilayer graphene sheets turn graphite-like above a certain thickness (>10 nm graphene layers), losing their vaunted SLG properties unless they constitute an inherent part of a specially designed macroscopic three-dimensional (3D) system. The transformation of nanoscale graphene layers into macroscopic structures is necessary to make graphene practical for industrial applications. Relative rotations between graphene layers in turbostratic MLG suppress $\pi$-orbital hybridization, thus restoring the electronic structure of individual SLGs in MLG configurations. This strategy has been implemented in, for example, large area chemical vapor deposition (CVD) of graphene on a nickel substrate and in 3D graphene fibers fabricated by thermal reduction of wet-spun aqueous dispersions of graphene oxide (GO) sheets.

Ultra-fine carbon fibers (~30 nm in diameter) have been prepared previously through the carbonization by ion-beam irradiation of polymer precursors or from radio-frequency plasma-enhanced chemical vapor deposition (PECVD). The resulting carbons from carbonization are all glassy in nature and cannot be easily deposited or converted into precise patterns.

Electrospinning is an alternative to wet spinning and chemical vapor deposition (CVD) for carbon nanofiber (CNF) fabrication. Electrospinning is a process using a voltage differential between a spinning tip and a collector plate to draw material from a polymer solution droplet on the spinning tip along a solution jet stream to the collector, thinning the polymer out in the process.

Far-field electrospinning (FFES) is an established technique that can operate with a distance of 10-30 cm between the spinning tip and the collector plate and a voltage differential of 10-30 kV, resulting in thick fiber mats with polymer fibers on the order of 2 μm to 200 nm diameter deposited at random. FFES requires high voltage and does not produce precision and control that are necessary for the fabrication of nanofibers.

Near-field electrospinning (NFES) operates with a distance of 0.5-1.0 mm between the spinning tip and the collector plate to collect the polymer solution jet on the collection plate. However, because the nanofiber jet is intercepted very close to the Taylor cone (the point of eruption at which the solution stream is drawn from the solution droplet), minimal fiber elongation occurs, and the polymer fiber remains relatively thick, with a diameter of 2 μm or greater and thus, does not produce nano fibers.

U.S. Pat. No. 8,586,148 discloses a near-field electromechanical spinning (NFEMS) process that includes a movable collection plate to thin the fibers by adding a mechanical pull to the electrostatic pull of previous electrospinning techniques.

However, the NFEMS process is limited: the movable collection plate operates in an xyz linear plane of motion, restricting the moveable collection plate's maximum speed and necessitating the occasional stopping and reversal of motion. Further, the NFEMS process is requires a minimum of 200V, resulting in fiber diameters of 200 nm or larger.

There is a desire for improvements on the existing systems and methods. There is also a desire for processes for fabricating carbon nanowires with ultrahigh electrical conductivity.

BRIEF SUMMARY OF THE EMBODIMENTS

The disclosure is directed to systems and processes for producing a carbon nanostructures. One embodiment is directed to a system configured to for forming carbon nanostructures with low voltage near-field electromechanical spinning (LV-NFEMS). The system includes an injector configured to output a polymer solution to an extruder tip, the injector including an absorbent band to control curvature of a polymer solution droplet of the extruder tip and a collector drum configured to rotate. The system also includes a voltage source configured to apply voltage to the extruder tip and the collector drum, and a stage configured to position the extruder tip relative to the collector drum. The extruder tip is positioned toward the collector drum to form a sustained jet of the polymer solution with the collector, and the stage is configured to move relative to the collector to form a carbon nanostructure.

In one embodiment, the polymer solution is a single polymer and the absorbent band is a paper band configured to wick excess polymer solution from the extruder tip.

In one embodiment, the collector is configured to support at least one substrate to receive the carbon nanostructure, and wherein the collector and injector are configured to pull and thin the carbon nanostructure.

In one embodiment, voltage source is configured to control meniscus curvature of the droplet of the extruder tip as a function of the applied voltage, and wherein the voltage source is a low voltage source.

In one embodiment, the sustained jet is initiated by direct contact of the polymer solution droplet to the collector to form a liquid bridge, and wherein the droplet and sustained jet are retracted to a first distance following formation of the liquid bridge.

In one embodiment, carbon nanostructure is an ultra-thin carbon fiber having a diameter of about 2 to 5 nanometers (nm).

In one embodiment, the carbon nanostructure is applied to a carbon electrode scaffold.

In one embodiment, rotating velocity of the collector and is matched to velocity of the sustained jet of polymer solution.

In one embodiment, the polymer solution includes polyacrylonitrile (PAN) and dimethylformamide (DMF).

In one embodiment, the system also includes pyrolyzing the carbon nanostructure.

Another embodiment is directed to a method for producing a carbon nanostructure by low voltage near-field electromechanical spinning (LV-NFEMS). The method includes outputting, by an injector, a polymer solution to an extruder tip, wherein the injector including an absorbent band to control curvature of a polymer solution droplet of the extruder tip. The method also includes rotating a collector drum, applying, by a voltage source, voltage to the extruder tip and the collector drum, and positioning, by a stage, the extruder tip relative to the collector drum. The extruder tip is positioned toward the collector drum to form a sustained jet of the polymer solution with the collector, and the stage is configured to move relative to the collector to form a carbon nanostructure.

In one embodiment, the polymer solution is a single polymer and the absorbent band is a paper band configured to wick excess polymer solution from the extruder tip.

In one embodiment, the collector is configured to support at least one substrate to receive the carbon nanostructure, and wherein the collector and injector are configured to pull and thin the carbon nanostructure.

In one embodiment, voltage source is configured to control meniscus curvature of the droplet of the extruder tip as a function of the applied voltage, and wherein the voltage source is a low voltage source.

In one embodiment, the sustained jet is initiated by direct contact of the polymer solution droplet to the collector to form a liquid bridge, and wherein the droplet and sustained jet are retracted to a first distance following formation of the liquid bridge.

In one embodiment, carbon nanostructure is an ultra-thin carbon fiber having a diameter of about 2 to 5 nanometers (nm).

In one embodiment, the carbon nanostructure is applied to a carbon electrode scaffold.

In one embodiment, rotating velocity of the collector and is matched to velocity of the sustained jet of polymer solution.

In one embodiment, the polymer solution includes polyacrylonitrile (PAN) and dimethylformamide (DMF).

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIGS. 8A-8E illustrate ultrathin pyrolyzed carbon nanofibers according to one or more embodiments;

FIGS. 9A-9D illustrate suspended nanofibers according to one or more embodiments;

FIGS. 10A-10F illustrates testing of a carbon nanofiber according to one or more embodiments;

DETAILED DESCRIPTION OF THE EXEMPLARY EMBODIMENTS

Overview and Terminology

Figure 1:
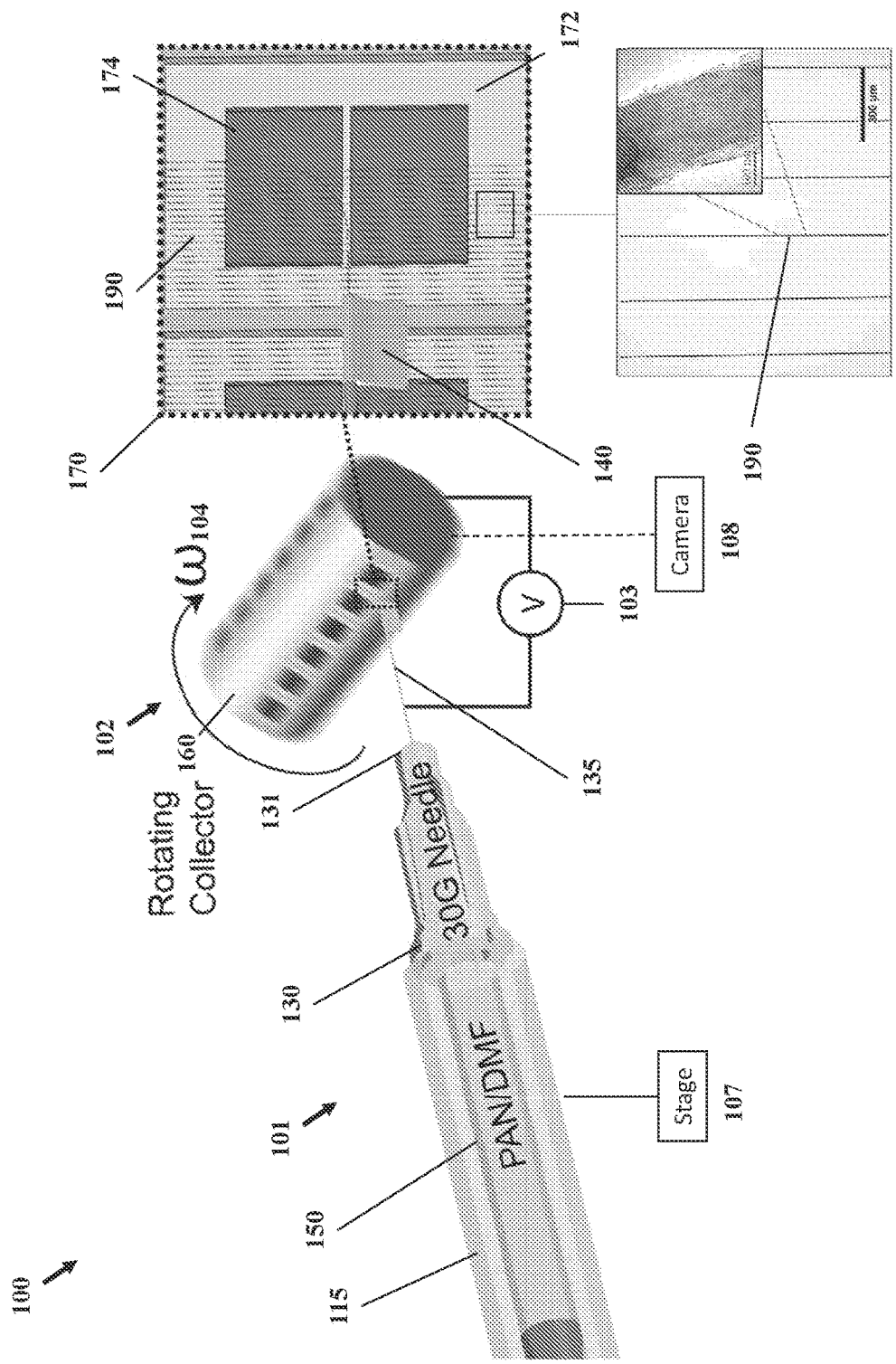
FIG. 1 is a graphical representation of low voltage near-field electromechanical spinning (LV-NFEMS) according to one or more embodiments.

One aspect of the disclosure is directed to fabricating carbon nanostructures. By way of example, systems and processes described herein can produce carbon nanowires on the order of about 2-5 nanometer (nm) with ultrahigh electrical conductivity using top-down and controlled reductive techniques from a polymer. As used herein, carbon nanostructures can include nanowires, three-dimensional (3D) macroscopic fibers, turbostratic structures, etc. Systems and processes described herein achieve ultrahigh electrically conductive nanofibers from a single polymer precursor solution. In one embodiment, the process is highly scalable and may be used to form multiple layers.

Embodiments are directed to systems and methods for near field electromechanical spinning for writing graphene fibers. Compared to existing spinning systems and methods, embodiments provide multiple benefits and advancements. By way of example, the systems and methods described herein can fabricate carbon nanostructures, such as nanofibers, with substantially lower applied voltages. Another advantage is the ability to generate highly conductive carbon nanostructures and/or increase the conductivity of nanofibers. As discussed herein, system configurations and processes include use of a polymer solution, rotating collector and pyrolysis to fabricate carbon nanofibers, such as graphene fibers, with reduced thickness (e.g., reduced fiber diameter), higher conductivity and improved material strength. Embodiments discussed herein also allow for the production of nanofibers without requiring or using nanotube infusion. As such, the embodiments can reduce the cost for production of nanofibers.

In one embodiment, systems and processes are configured to fabricate microstructures exhibiting high elasticity and conductivity without the need for CNT templating (the use of CNTs in the polymer precursor solution to assist with nanofiber formation) or additional processing when converting the polymer to carbon by using low voltage near-field electromechanical spinning (LV-NFEMS) with a first thinning of the fiber on a rotating drum and a second thinning during pyrolysis on a carbon scaffold, resulting in a turbostratic graphene microstructure extending throughout the fiber with a conductivity of at least $6\times10^6$ S m$^{-1}$. In one embodiment, LV-NFEMS combines the best features of NFES (i.e. deposition control) with those of FFES (i.e. fiber elongation and polymer chain alignment). In one embodiment, sufficient polymer thinning by the rotating drum and a subsequent pyrolysis results in ~2-5 nm carbon wires. In one embodiment, the polymer chains align during pyrolysis, resulting in a turbostratic graphene microstructure written with precision and control in any configuration. As such, embodiments provide improved control and fabrication.

In another embodiment, systems and processes described herein can include use of an array of polymer precursor nanofibers suspended onto a silicon substrate with two carbon posts and converted to carbon nanowires exhibiting ultrahigh electrical conductivity. More specifically, in one embodiment, the smallest polymer nanofibers are extruded using extremely low voltage NFEMS, wherein the LV-NFEMS process extrudes a modified solution of polyacrylonitrile (PAN) and dimethylformamide (DMF). In another embodiment, modified heat treatment converts the polymer precursor nanowire to carbon with the original nanowire diameter significantly reduced. In one embodiment, the size reduction ranges between 20 ~40 times starting from polymer nanofiber diameters of 100~200 nm and ending with observable carbon nanowire diameters ranging from 3~40 nm. In one embodiment, samples with nanowires below 15 nm exhibit ultrahigh conductivity. In one embodiment, carbon nanowires with diameters below 30 nm are comprised of planes of single-layer graphene.

In one embodiment, a periodic array of uniform ordered ultra-thin carbon fibers can be integrated onto a carbon electrode scaffold. The smallest final carbon nanowire diameter is best achieved by minimizing the electrospinning droplet surface area and by minimizing the applied electrospinning voltage.

Embodiments may also be configured to fabricate 3D macroscopic fibers composed of 2D graphene by thermal reduction of as-spun insulating graphene oxide fibers. Embodiments can include pyrolysis of ordered arrays of polymer nanofibers, freely suspended or deposited on different substrates including silicon and a carbon electrode scaffold. When the polymer chains in the polymer fibers are randomly oriented, pyrolysis results in glassy carbon retaining the original unordered morphology of the polymer chains. Embodiments discussed herein include manufacture of ultrathin carbon fibers using a LV-NFEMS set-up and subsequent pyrolysis. Transmission electron microscopy (TEM) inspection of fabricated materials produced by one or more embodiments reveal that untangling or untwisting of the polymer chains in the polymer fibers after pyrolysis results in much more highly crystalline carbon fibers. This more ordered carbonization result may be facilitated by the dramatic shrinkage of the fiber's diameter during pyrolysis. One embodiment presents fibers that, through this process, undergo a shrinkage of up to 4900% (e.g., from a ~245 nm polymer fiber to a ~2-5 nm carbon fiber). In one embodiment, the controllable deposition of these carbon nanofibers on a carbon electrode scaffold allows for the study of the electrical properties of these ultra-thin carbon fibers.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Low Voltage Near-Field Electromechanical Spinning (LV-NFEMS)

FIG. 1 is a graphical representation of system configured for low voltage near-field electromechanical spinning (LV-NFEMS) according to one or more embodiments. FIG. 1 shows an exemplary embodiment of a low voltage near-field electromechanical spinning (LV-NFEMS) system 100. In one embodiment, system 100 may perform a process to produce and/or fabricate carbon nanostructures, such as carbon fibers on the order of ~2-5 nm and one or more layers of carbon fibers.

In one embodiment, system 100 is a near field electromechanical spinning system configured to write graphene fibers from a polymer solution. As shown in FIG. 1, system 100 includes injector 101, collector drum 102, voltage source 103. Injector 101 may relate to a probe configured to apply a polymer solution (e.g., polymer ink) to collector 102, which may be a rotating collector. As provided herein, the collector 102 can improve the speed and movement for creating microstructures. System 100 and collector 102 also allow for fiber generated by the injector 101 to be pulled via electrical and mechanical forces to thin the fiber. According to one embodiment, collector 102 may be equipped with at least one substrate for nanofiber patterning. In certain embodiments, system 100 includes a jet initiation procedure in contact mode. According to another embodiment, a meniscus curvature change is provided as a function of the applied voltage: the lower the voltage the smaller the ink volume around the needle. System 100 can also include an absorbent band (e.b., absorbent paper strip) to wick excess polymer solution. Based on the configuration, nanofibers may be fabricated with ultrahigh conductivity (e.g., similar to that of graphene) and fibers may be fabricated with diameters less than 30 nm.

According to one embodiment, injector 101 is configured to output a polymer solution 150 to an extruder tip, the injector including an absorbent band to control curvature of a polymer solution droplet of the extruder tip 131. FIG. 1 illustrates injector 101 as a syringe 115 equipped with a conductive needle 130 (30 G). Syringe 115 may be filled with a polymer solution 150 and loaded onto the syringe pump. System 100 may be configured to position injector 101 relative to collector drum 102. Polymer solution 150 may relate to a single polymer. As will be discussed in FIG. 3A, extruder tip 131 may include an absorbent band (e.g., paper band) configured to wick excess polymer solution from the extruder tip. According to another embodiment, polymer solution 151 may include polyacrylonitrile (PAN) and dimethylformamide (DMF). System 100 may also be configured to control a jet of polymer solution from injector 101 towards collector 102.

According to one embodiment, collector drum 102 is configured to rotate as by direction 104 and includes an outer surface 160 configured to support at least one substrate, such as silicon chip 170. System 100 may be configured to control collector 102 and injector 101 to pull and thin the carbon nanostructure. According to another embodiment, system 100 may control the rotating velocity of collector 102 to match velocity of a sustained jet of polymer solution from injector 101.

Voltage source 103 is configured to apply voltage to the extruder tip 131 and collector drum 102. Voltage source 103 may be configured to control meniscus curvature of the droplet of the extruder tip 131 as a function of the applied voltage. According to another embodiment, system 100 is configured to operate with voltage source 103 is a low voltage source (e.g., ~35 volts (V)).

According to one embodiment, system 100 includes stage 107 configured to position the extruder tip 131 and injector 101 relative to collector drum 102. By way of example, extruder tip 131 may be positioned toward collector drum 102 to form a sustained jet of the polymer solution with the collector. Stage 107 configured to move relative to the collector to form a carbon nanostructure in at least two dimensions (e.g., x-direction towards collector 102 and Y direction to write fibers on collector 102 surface).

System 100 may perform processes for fabrication of carbon nanostructures. As shown in FIG. 1, system 100 includes operations of a process that may include fabricating nanostructure from a polymer solution. In one embodiment, polymer nanofibers 190 are patterned or deposited onto a silicon chip 170 using a custom LV-NFEMS configuration, such as system 100. In one embodiment, injector 101 may be a syringe pump (Sarasota, UMP3 152842 F04D) mounted onto a digitally controlled X-Y stage, such as stage 107.

Collector drum 102 (e.g., rotating drum) may include one or more grooves. In one embodiment, a variable power supply 103 is configured to used to apply a voltage between the extruder tip 135 and the collector drum 102. In one embodiment, camera 108, which may include with a high magnification lens, is used to monitor the initiation process. Injector 101 may relate to a syringe 115 equipped with a conductive needle 130 (30 G) filled with the polymer solution 150 and loaded onto the syringe pump. In one embodiment, a porous absorbent band 140 is placed near the tip of the needle 130 and silicon chips, such as silicon chip 170, are attached onto the grooves of the rotating collector 102 using carbon tape. In one embodiment, the collector speed and power supply voltage are set to the desired parameters. According to another, jet initiation is performed by monitoring the meniscus of the droplet displayed by the camera. In one embodiment, stage 107 is used to move the droplet output by a injector. In one embodiment, once a sustained jet 155 is established, the stage 107 is moved (e.g., along a y-axis) to pattern the nanofibers 190. In one embodiment, deposition onto the substrate 170 is verified using an up-right microscope. In one embodiment, the number of deposited nanofibers 190 is varied by changing the stage velocity. FIG. 1 illustrates mask pattern 172 including posts 174. Accordingly, system 100 is configured to perform a process for producing a carbon nanostructure by low voltage near-field electromechanical spinning (LV-NFEMS), In one embodiment, deposition onto the substrate 170 is verified using an up-right microscope. In one embodiment, the number of deposited nanofibers 190 is varied by changing the stage velocity. Carbon nanostructures formed may be ultra-thin carbon fibers having a diameter of about 2 to 5 nanometers (nm). In certain embodiments, the carbon nanostructure is applied to a carbon electrode scaffold. According to another embodiment, carbon nanostructure may be pyrolyzed.

Figure 2A:
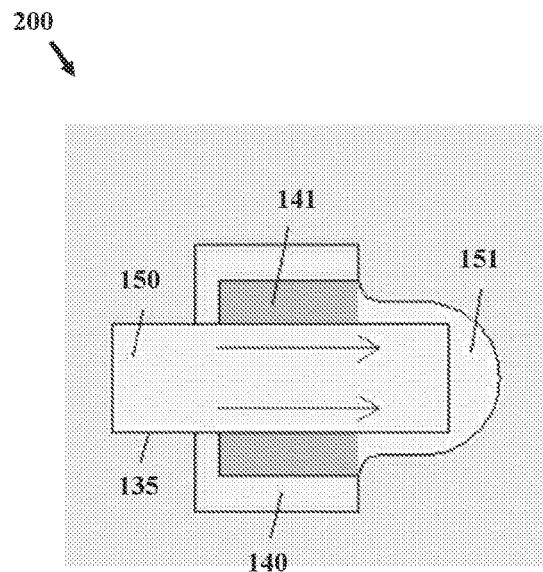
FIGS. 2A-2D illustrate fiber deposition starting with a modified jet initiation procedure according to one or more embodiments.
Figure 2B:
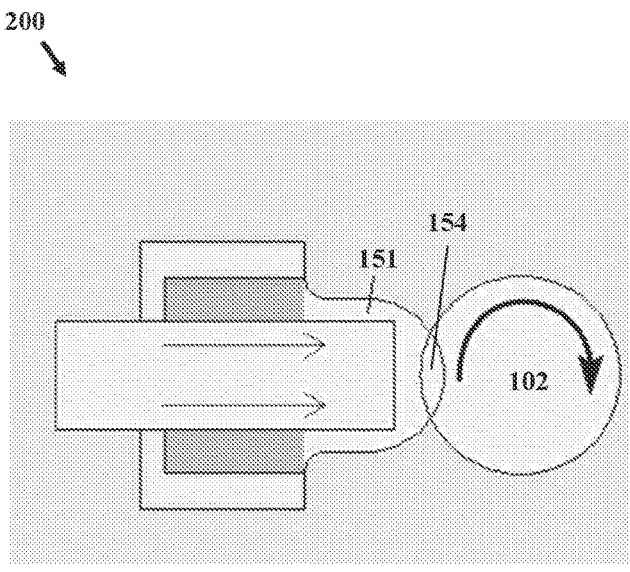
Figure 2C:
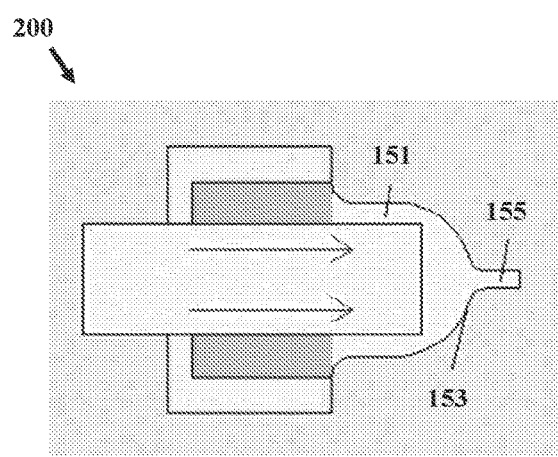
Figure 2D:
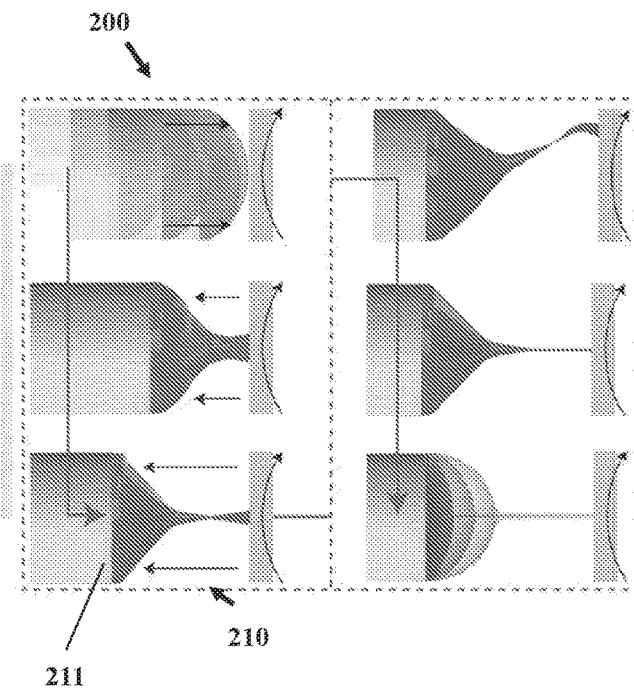

FIGS. 2A-2D illustrate fiber deposition according to one or more embodiments. Process 200 starts with a modified jet initiation procedure. FIG. 2A is a side view of an exemplary embodiment of the fiber deposition process, wherein the meniscus is initially formed. FIG. 2B is a side view of an exemplary embodiment of the fiber deposition process, wherein the near-field electromechanical spinning configuration initiates the fiber jet by means of direct contact. FIG. 2C is a side view of an exemplary embodiment of the fiber deposition process, wherein a fiber jet has been fully established. FIG. 2D is an alternate side view of an exemplary embodiment of the fiber deposition process depicted in FIGS. 2A-2C.

In one embodiment, carbon nanowires are fabricated by carbonizing polymer fibers starting from a polymer precursor solution 150. In one embodiment, the polymer precursor solution 150 is formed by dissolving solid PAN powder in DMF (8.3% w/w) on a stirred hotplate. In one embodiment, the temperature of the stirred hotplate is increased from 75° C. to 100° C. at a rate of 1° C./hour, increased to 115° C. for 6 hours, then reduced back to 75° C. for 6 hours. In one embodiment, the polymer solution 150 is used to fabricate polymer nanofibers 190 using the LV-NFEMS configuration 100. This stage of the process is further disclosed in the PAN Polymer Precursor Solution Heating Protocol section.

FIGS. 2A-2D illustrate operations of a process that may include fabricating a polyacrylonitrile (PAN) nanofiber using the LV-NFEMS process by controlling the curvature of a polyacrylonitrile/dimethylformamide (PAN/DMF) droplet 151 using an absorbent paper band 140, then minimizing the working voltage of a LV-NFEMS configuration, such as system 100. In one embodiment, the working voltage is a voltage between a extruder tip 135 (e.g., spinning tip) and a collector drum 102, and the working voltage is provided by a voltage source 103. In one embodiment, the process further utilizes a new jet initiation approach to overcome the limitations of a lower working voltage.

FIG. 2A illustrates droplet 151 formed from polymer solution 150 and extruder tip 135. Droplet 151 is formed by flow 141 along an x-axis towards the rotating collector 102, wherein direct contact of droplet 151 with collector 102 is shown as 154 in FIG. 2B. The injector and extruder type 135 may be retracted as shown in FIG. 2C in order for a sustained jet 155 and extraction may be based on observation/detection of the sustained jet. In one embodiment, the droplet 151 with the sustained jet 155 is retracted to a given tip-to-collector distance after jet initiation. In one embodiment, the given tip-to-collector distance is 0.95 mm.

In one embodiment, once a sustained jet 155 is established, the stage is moved along a y-axis to pattern the polymer fibers, such as polymer nanofibers 190 of FIG. 1. FIG. 2D illustrates initiation of a sustained jet by direct contact of the polymer solution droplet to the collector to form a liquid bridge, and wherein the droplet and sustained jet are retracted to a first distance following formation of the liquid bridge.

To fully understand how to utilize the potential of the LV-NFEMS process, understanding the jetting behavior of the fiber jet 155 is necessary. In one embodiment, the LV-NFEMS jet 155 behavior can be best summarized as a series of counteracting forces, wherein jet initiation occurs when the electrostatic pressure ($\sim \epsilon_o E^2$) generated by an electric field E for a given the permittivity of free space $\epsilon_o$ becomes comparable to the capillary pressure $$\left( \sim \frac{\gamma}{a} \right)$$

at the surface of the polymer droplet 151 with surface tension γ and diameter α. In order to deposit straight nanofibers 190, the velocity of the collector drum 102 must be equal to the velocity of the jet 155, $v_{jet}$, given in the equation below:

$$v_{jet} = \left( \frac{\pi K \gamma}{\varepsilon_0 \rho} \right)^{\frac{1}{3}} \frac{1}{f^2},$$

for a liquid of conductivity K and density ρ, f is the non-dimensionalized radius of the jet 155. In one embodiment, the inverse square relationship between the velocity of the jet 155 and the radius of the jet 155 suggests that smaller nanofibers 190 are generated with higher jet velocities. An alternative relationship describing jet radius for a rotating collector drum 102 with an applied voltage (V) and spinneret-to-collector distance (L) is given by the following equation:

$$r \sim \frac{100 V^2 K^{\frac{2}{5}}}{\rho v_{jet}^{\frac{2}{5}} L} \text{ nm},$$

The square relationship between jet diameter and applied voltage implies the electric field is a dominant force on the diameter of the final fiber of nanofibers 190, with the lowest voltages yielding the smallest fibers 190. In one embodiment, to thin the nanofibers 190 in this regimen further, the velocity of the collector drum 102 must be made more than or equal to the velocity of the jet 155. In one embodiment, PAN nanofibers 190 below 200 nm are achieved with a LV-NFEMS set-up 100 at voltages as low as 35 V. However, once the applied voltage approaches such a low value, jet initiation becomes extremely challenging.

In one embodiment, a modified jet initiation procedure may allow for a lower operational voltage. In one embodiment, fiber jet initiation occurs when the critical voltage ($V_0$) begins scaling with $$\left( \frac{\gamma d}{\varepsilon_0} \right)^{\frac{1}{2}}$$

for a liquid droplet of diameter (d). The standard methods of initiation are realized by either increasing the applied voltage or reducing the droplet-to-collector distance since the droplet 151 diameter is limited. However, these methods result in unpredictable outcomes such as sudden jet discharge. Alternatively, it is possible to initiate the jet 155 by piercing the droplet 151 with a sharp object, lowering the surface tension of the droplet 151, but this results in large variations in the fiber 190 diameter.

In one embodiment, it is possible to classify the behavior of jet initiation as one of two unique behaviors: non-contact mode and indirect contact mode. In traditional non-contact mode, the electrostatic forces slowly overcome the surface tension by shaping the meniscus of the droplet 151 towards a cone 153 until a very thin fiber jet 155 is produced. Once the fiber jet 155 is established, the meniscus of the droplet 151 recedes back to a circular shape. In one embodiment, in the newly-established indirect contact mode, the collector drum 102 is brought to close proximity to the droplet 151 until a liquid bridge 154 is formed. Similar to non-contact mode, the meniscus begins deforming towards a conical shape, but instead of jetting a thin fiber 155, the tip of the meniscus cone 153 contacts the collector drum 102, forming a liquid bridge 154. Immediately upon formation of the liquid bridge 154, electric charges previously accumulated at the droplet 151 surface discharge and reduce the electric stress, allowing the meniscus of the droplet 151 to recede back to the original shape while maintaining the newly established jet 155, wherein the liquid bridge 154 becomes the jet 155 once the meniscus of the droplet 151 has receded.

Though contact mode produces initial jet diameters similar to the diameter of the contact area, it is more consistent than non-contact mode. In one embodiment, contact mode occurs predominately with mid-range voltages (500V-1200V) while non-contact dominates with high-range voltages (>1200V).

In one embodiment, the LV-NFEMS process utilizes a new contact mode for extremely low voltage operation, termed "direct contact", to ensure consistency and reproducibility. In indirect contact mode, the liquid bridge 154 forms when the droplet 151 is slowly brought to the collector drum 102, deforming the droplet 151 enough for the electrostatic force to overcome the surface tension. With the LV-NFEMS process, the extremely low voltage is insufficient for producing the droplet deformation required to lower the surface tension, thus requiring direct contact mode. In one embodiment, the direct contact mode ensures that a large liquid bridge 154 is formed and the electrostatic force continuity is maintained through the fiber jet 155. In one embodiment, after using direct contact mode to initiate the fiber jet 155, the extruder tip 135 is moved to and held at a distance of 0.95 mm away from the collector drum 102.

FIG. 2D illustrates process 205 including initiation of a sustained jet by direct contact of the polymer solution droplet to the collector to form a liquid bridge, and wherein the droplet and sustained jet are retracted at 210 to a first distance 211 following formation of the liquid bridge 212.

Figure 3A:
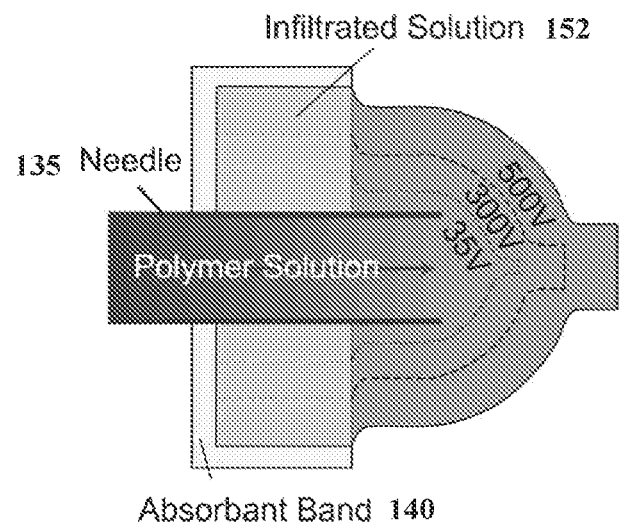
FIG. 3A illustrates a spinning tip with a solution droplet according to one or more embodiments.

FIG. 3A illustrates a spinning tip with a solution droplet according to one or more embodiments. FIG. 3A shows spinning tip 135 with a solution droplet 151 with a meniscus at various sizes dependent on working voltage. In one embodiment, control of the meniscus of the droplet 151 is one of the critical factors in reaching the thinnest possible nanofiber. In one embodiment, meniscus control is responsible for bringing the working electrospinning voltage down to as low as 34.7V. FIG. 3A depicts the volume of the polymer solution outside the spinning tip 135; in one embodiment, different volumes allow for different limiting voltages. In one embodiment, the smallest possible meniscus volume corresponds to the smallest possible working voltage (34.7V). In one embodiment, an absorbent paper band 140 further assists in reducing the meniscus volume by wicking excess polymer solution, wherein the excess polymer solution is represented as infiltrated solution 152.

Figure 3B:
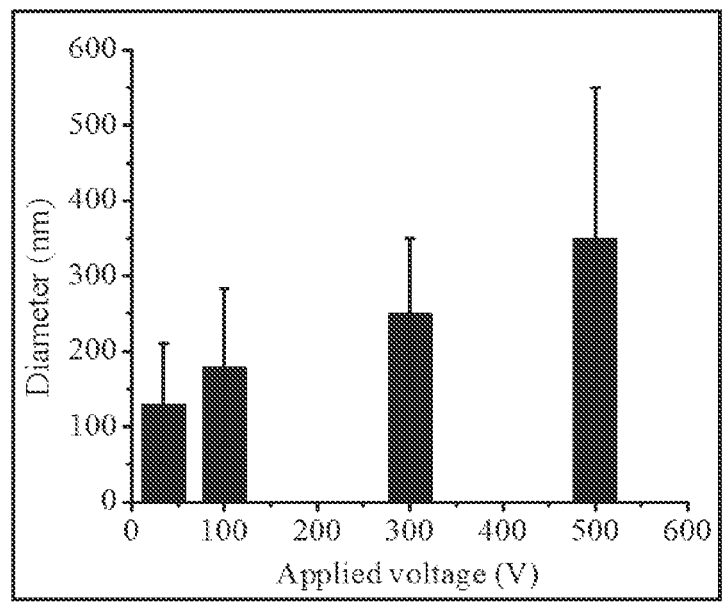
FIG. 3B is a graph depicting the relationship between applied voltage and polymer nanofiber diameter according to one or more embodiments.

FIG. 3B is a graph depicting the relationship between applied voltage and polymer nanofiber 155 diameter for the spinning tip 135 and solution meniscus 151 of FIG. 3A.

Figure 4A:
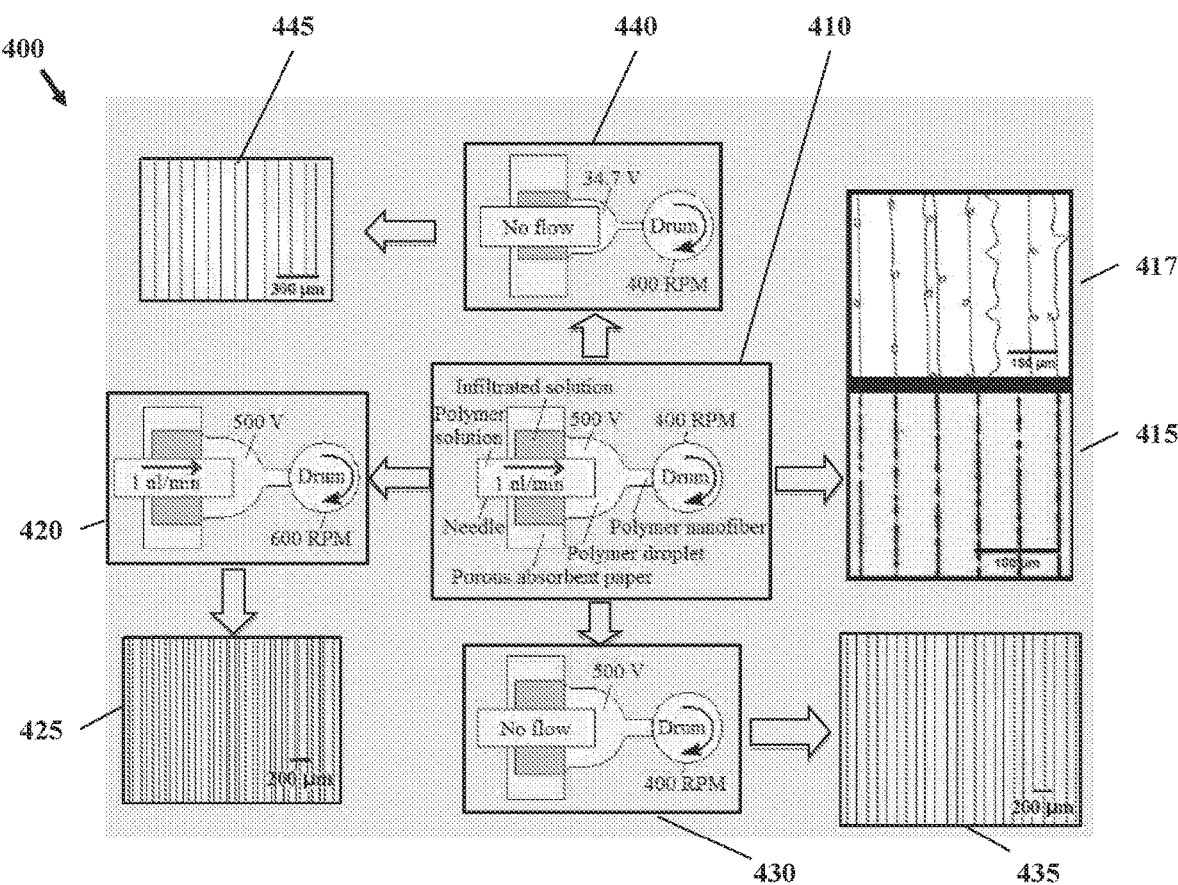
FIG. 4A illustrates a process for polymer nanofibers according to one or more embodiments.

FIG. 4A illustrates a process for polymer nanofibers according to one or more embodiments. FIG. 4A illustrates a collection of side views and transmission electron microscopy (TEM) views depicting a plurality of exemplary embodiments of manufacturing methods of uniformly aligned polymer nanofibers 190 without bending instabilities.

Figure 4B:
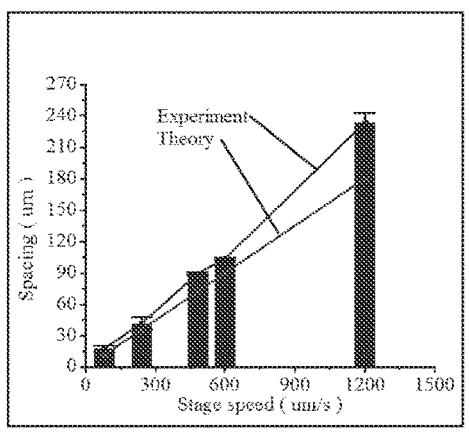
FIG. 4B is a graph depicting the relationship between the speed of the stage and the spacing between deposited nanofibers according to one or more embodiments.
Figure 4C:
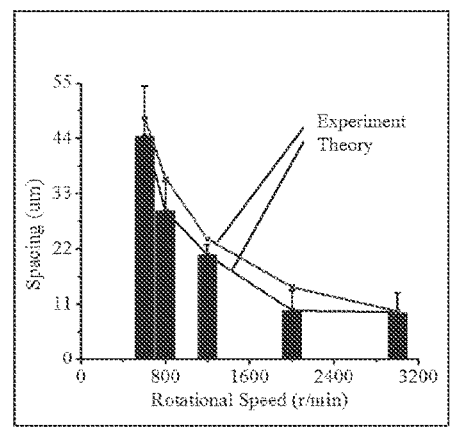
FIG. 4C is a graph depicting the relationship between the rotational speed of the collector and the spacing between deposited nanofibers according to one or more embodiments.

In one embodiment, for rapid patterning of polymer nanofibers (e.g., nanofibers 190) on a substrate (e.g., substrate 170), a silicon substrate is mounted in a groove on the collector drum 102 using carbon tape. In one embodiment, the linear movement of the syringe 115 holding the polymer solution 150 along the surface of the collector drum 102 ensures that fibers emanating from the needle cover the silicon substrate 170 in an ordered parallel fashion. In one embodiment, the collector drum 102 introduces a controllable mechanical pull on the fiber being deposited that can force fibers 190 jetted on a solid surface to follow straight patterns (as per microscopic image 425) or cause suspended fibers between carbon electrode scaffolds 174 to remain taut. A key impediment to improving patterning precision of nanofibers is the presence of bending instabilities, such as the string of beads and the loops shown in microscopic images 415 and 417. The continuous fiber ejection at relatively high rotational speeds (600 RPM, see illustration 420) and the unprecedented low voltages (which may be 34.7V, see illustration 440) employed in the near-field electromechanical spinning configuration 100 may easily overcome these bending instabilities (see microscopic images 425 and 445). In one embodiment, relatively high rotational speeds may also exert more force on the polymer jet 155 and thin the polymer jet 155 out further. In another embodiment, the very low fluid flow increases the mechanical stretching of the nanofibers between the substrate 170 on the collector drum 102 and the polymer droplet 151 and explains the absence of bending instabilities without the need of increasing rotational speed or lowering voltage (see illustration 430 and microscopic image 435). A smaller fiber-to-fiber spacing can improve the amount of fibers 190 per unit area and in our set-up is determined by $d=v/\omega$ where d is the spacing between polymer nanofibers 190, v the speed of the X-Y stage on which the syringe 115 is mounted, and $\omega$ the rotating speed of the collector drum 102. A comparison of theory and experiment in FIGS. 4B and 4C shows a consistent controlled spacing between polymer fibers 190 without bending instabilities in one embodiment. Processes and configurations discussed herein provide for large-area manufacturing of aligned carbon fibers. In one embodiment, regular arrays can be deposited as long as w is above 400 RPM and v is above 80 μm/s. Below these conditions, overlapping between polymer nanofibers 190 occurs. In one embodiment, lowering the velocity of the fluid flow down to zero (illustrations 430 and 440) leads to a straight deposition pattern overcoming these instabilities (microscopic images 435 and 445).

FIG. 4B is a graph depicting the relationship between the speed of the stage and the spacing between deposited nanofibers 190. As shown in FIG. 4B, as stage speed increases, spacing increases as well. FIG. 4C is a graph depicting the relationship between the rotational speed of the collector drum 102 and the spacing between deposited nanofibers 190. As rotational speed of the drum increases spacing decreases.

PAN Polymer Precursor Solution Heating Protocol

Figure 5A:
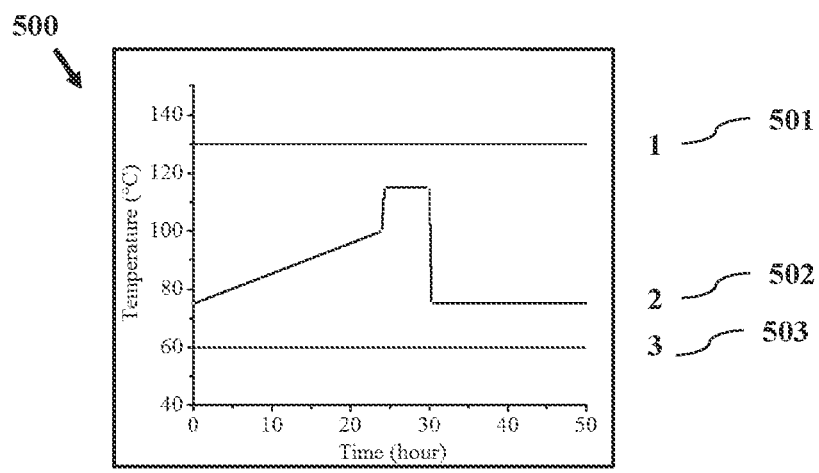
FIG. 5A is a graph depicting the relationship between time and temperature for a plurality of solution dissolution protocols according to one or more embodiments.
Figure 5B:
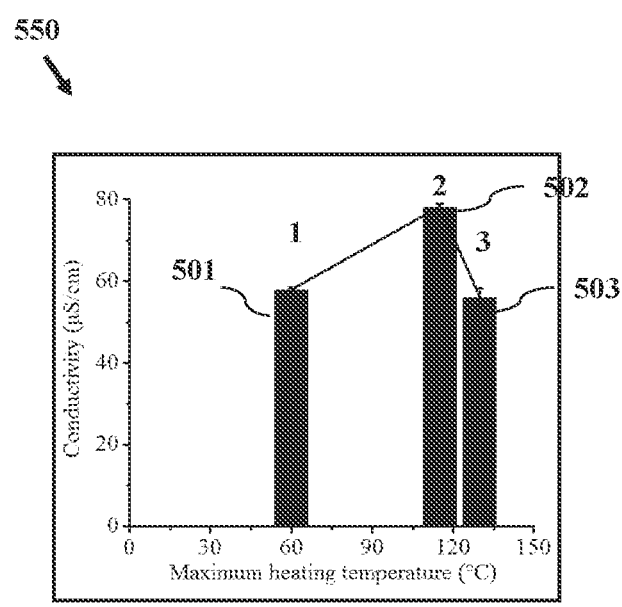
FIG. 5B is a graph depicting the relationship between maximum heating temperature of the dissolution protocols of FIG. 5A and the conductivity of the resultant polymer fibers according to one or more embodiments.

FIG. 5A is a graph depicting the relationship between time and temperature for a plurality of exemplary solution dissolution protocols. FIG. 5B is a graph depicting the relationship between maximum heating temperature of the dissolution protocols of FIG. 5A and the conductivity of the resultant polymer fibers 190. Protocols 1 and 3, shown as 501 and 503, represent two embodiments of fixed temperature dissolution protocols with temperatures of 60° C. and 75° C., respectively. Protocol 2, shown as 502, represents an embodiment of a variable temperature dissolution protocol.

Polymer precursor solutions used for electrospinning are commonly dissolved by constant stirring at a fixed temperature, for example protocols 1 and 3. However, the solutions used for LV-NFEMS that were prepared with the typical fixed temperature dissolution protocols were unable to produce fibers at extremely low voltages.

In one embodiment, the PAN/DMF solution 150 is prepared by dissolving commercial PAN powder (molecular weight, MW=150,000) in N,N-DMF by magnetic stirring with various heating profiles as shown in FIG. 5A. In one embodiment, the PAN/DMF solution 150 is an 8.26 wt. % PAN in DMF solution.

In one embodiment, a new variable temperature dissolution protocol (which may be embodied by protocol 2) is used in preparing the PAN/DMF solution 150, in turn assisting in sustaining the fiber jet 155 when the initial bridge 154 is thinned. Instead of the constant temperature dissolution of protocols 1 and 3, this embodiment of the variable temperature dissolution protocol ramps the temperature from 75° C. to 100° C. (1° C./hour), then holds a constant temperature at 115° C. for 6 hours, and finally returns to 75° C. In one embodiment, Fourier-transform infrared spectroscopy (FTIR) and x-ray photoelectron spectroscopy (XPS) analysis reveal no significant disparities in the molecular composition of the solution 150 prepared with the modified dissolution procedure, but in another embodiment, a slight increase in conductivity of the PAN/DMF solution 150 from 60 to 80 μS cm$^{-1}$ is observable (see FIG. 5B). In one embodiment, the increase in conductivity is attributed to the slight oxidation of the solution 150, indicated by a color change from light yellow to brownish yellow. In one embodiment, the slow increase in temperature above the glass transition point ($T_g$~80° C.) allows the PAN polymer chain to fully uncoil, resulting in a homogenous solution of uncoiled polymer chains. In one embodiment, the slow heating procedure of the variable temperature dissolution protocol untangles the polymer chains, exposing the nitrile groups for charge transfer. Subsequent electrospinning of this modified solution 150 may confine the uncoiled polymer chain into the polymer nanofiber 190. In one embodiment, the use of a PAN/DMF solution 150 prepared by the variable temperature dissolution protocol allows for a sustainable fiber ejection at 35V, making the ultrathin fiber manufacturing process possible. In one embodiment, the use of the specially prepared PAN/DMF solution 150 enables the LV-NFEMS process to produce nanofibers with a diameter of 50-75 nm.

Stabilization and Pyrolysis Process (Carbon Scaffold)

In one embodiment, the silicon chips 170 with the carbon posts 174 are fabricated using standard photolithography and similar pyrolysis techniques. In one embodiment, silicon wafers 172 with 1000 nm thermal oxide (resistivity=100 Ω-cm) are used as-received and the surface is washed with isopropanol/acetone to remove contaminants. In one embodiment, SU-8 2015 is spun coat (3000 rpm) followed by a soft-bake (3 min at 95° C.). In one embodiment, the mask pattern for the posts 174 is patterned with UV (140 s with 140 mV cm$^{-2}$ dose) followed by a post-exposure bake (3 min at 95° C.) and developed. In one embodiment, the silicon dioxide wafer 172 with the patterned posts is pyrolyzed at with a one-step heating to 900° C. (2.5° C./min). In one embodiment, the wafer 172 with patterned carbon is diced to obtain the final carbon scaffolds 174.

In one embodiment, the polymer nanofibers 190 deposited on the silicon chips 170 are heat treated before being pyrolyzed. In one embodiment, the silicon chips 170 with the patterned nanofibers 190 are placed into an oven at 115° C. in atmospheric conditions (20 hours). In one embodiment, the heat-treated samples are pyrolyzed in a Lindberg Blue M tube furnace (Thermo Scientific, STF55666C-1). In one embodiment, the tube is purged with nitrogen before pyrolysis to ensure an inert atmosphere. In one embodiment, the tube furnace, with $N_2$ flowrate of 3600 sccm, is heated from 25-115° C. (2.5° C./min), held at 115° C. (3 hours), ramped from 115-1000° C. (10° C./min), 190 then allowed to cool naturally from 1000° C.

Figure 6A:
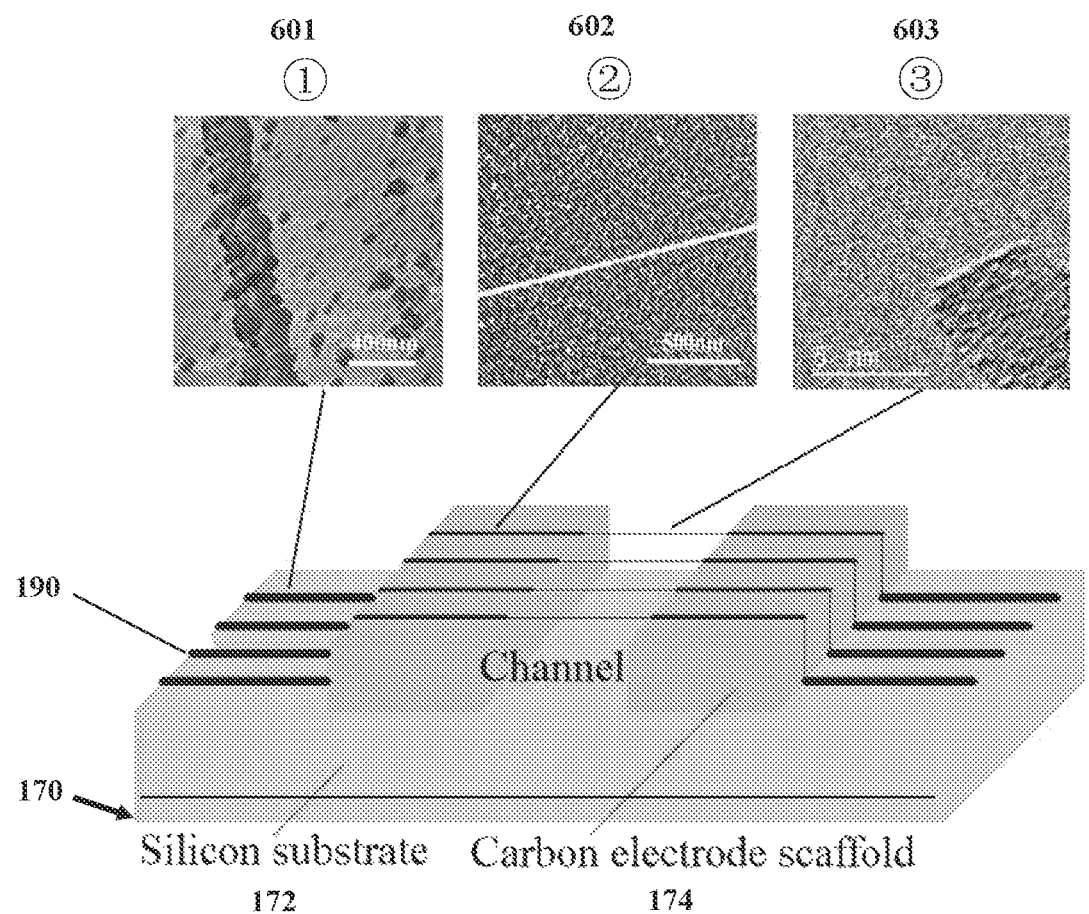
FIG. 6A illustrates a plurality of suspended fibers on a silicon substrate and a carbon electrode scaffold according to one or more embodiments.
Figure 6B:
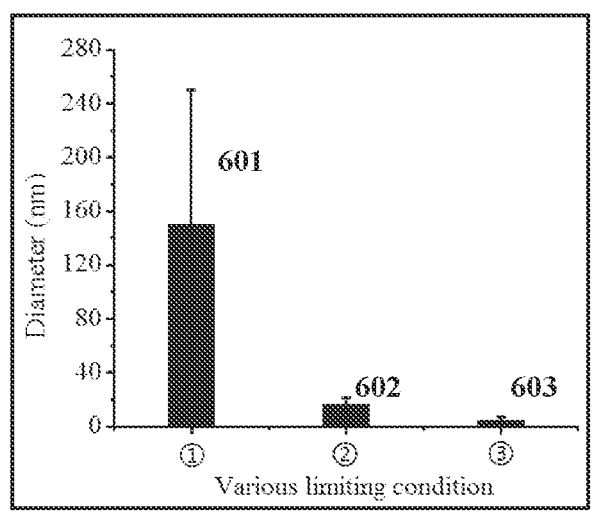
FIG. 6B is a graph illustrating diameters of fibers relative to fiber limiting conditions found of the different according to one or more embodiments.

FIG. 6A illustrates a plurality of suspended nanofibers 190 on a silicon substrate 170 and a carbon electrode scaffold 174. FIG. 6B is a graph illustrating diameters of fibers relative to fiber limiting conditions. In one embodiment, the deposition substrate 170, which may be a collector drum, includes a silicon substrate 172 (e.g., silicon chip) with two carbon posts 174 or carbon electrode scaffolds, separated with a distance of 220 µm between the adjacent walls of the posts 174. In one embodiment, the nanofibers 190 are deposited across the substrate 170 and are in contact with the surface of silicon substrates 172 (limiting condition ① shown as 601), the surface of carbon post 174 (limiting condition ② shown as 602), or suspended across the adjacent walls of the carbon posts 174 (limiting condition ③ shown as 603). In one embodiment, the carbon posts 174 provide ohmic contact while also maintaining uniform force distribution of the suspended carbon fibers 190 during size transformations through the heating process.

Typically, nanofibers 190 on substrate 170 are stabilized at 115° C. ~120° C. by 20 hours of air-oxidation then carbonized at temperatures up to 1000° C. in a quartz tube under nitrogen flow. Carbon nanofibers on a silicon surface can exhibit non-uniform granularity with a significantly larger diameter. In one embodiment, nanofibers 190 in contact with the carbon surface 174 display significantly improved carbon fiber uniformity and morphology. In one embodiment, fibers 190 suspended by the two carbon posts 174 yielded the smallest carbon fiber diameters on a given substrate. The thermal expansion mismatch between silicon and carbon may cause the nanofibers 190 to breakup into neatly arranged particles.

Figure 7A:
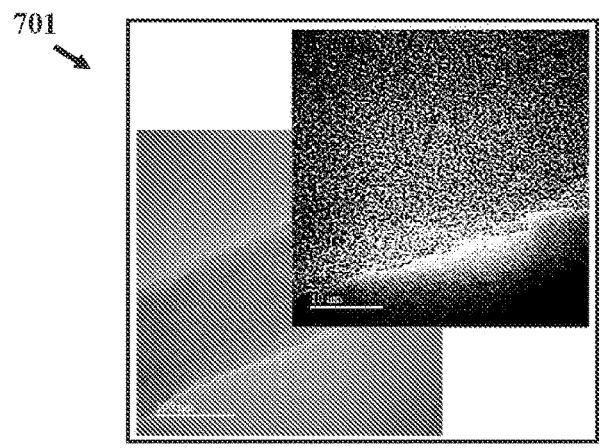
FIGS. 7A-7D illustrate views of polymer nanofibers according to one or more embodiments.
Figure 7B:
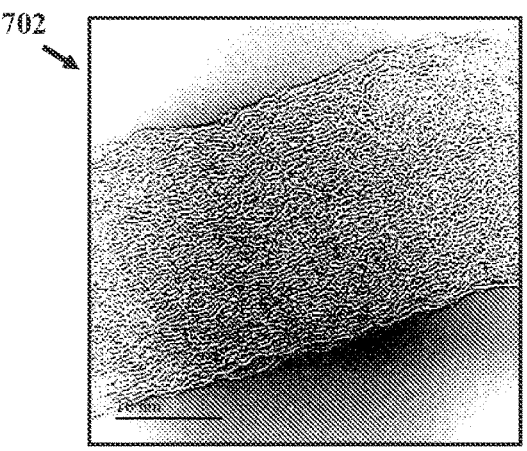
Figure 7C:
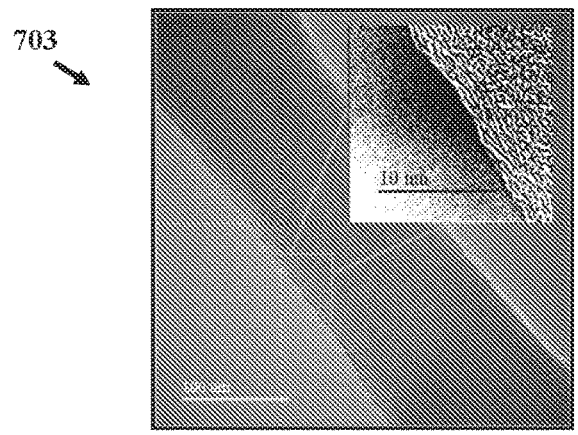
Figure 7D:
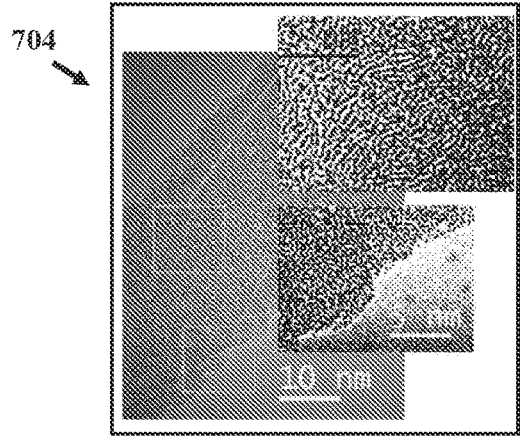

FIGS. 7A-7D illustrate views of polymer nanofibers according to one or more embodiments. FIG. 7A is a TEM view of an exemplary embodiment of a polymer nanofiber 701 at 300V. FIG. 7B is a TEM view of an exemplary embodiment of a carbon nanofiber 702 produced from a polymer nanofiber (e.g., nanofiber 701) of FIG. 7A by means of pyrolysis. FIG. 7C is a TEM view of an exemplary embodiment of a polymer nanofiber 703 at 500V. FIG. 7D is a TEM view of an exemplary embodiment of a carbon nanofiber 704 produced from the polymer nanofiber 703 of FIG. 7C by means of pyrolysis.

Figure 7E:
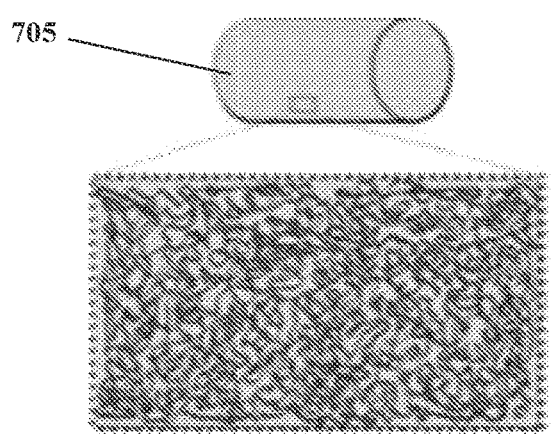
FIG. 7E illustrates molecular chains of a polymer fiber before pyrolysis according to one or more embodiments.
Figure 7F:
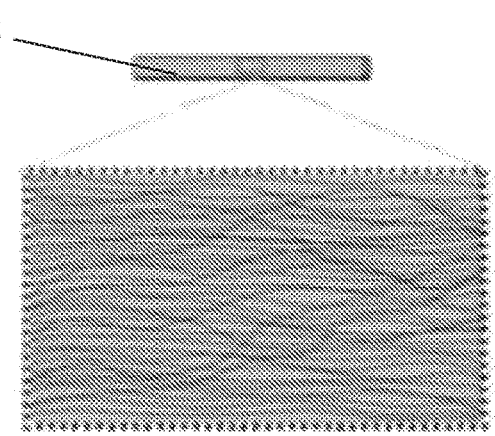
FIG. 7F illustrates molecular chains of a carbon nanofiber after pyrolysis according to one or more embodiments.

FIG. 7E illustrates molecular chains of a polymer fiber 705 before pyrolysis according to one or more embodiments. FIG. 7F illustrates molecular chains of a carbon nanofiber 706 after pyrolysis according to one or more embodiments. Although assembled macroscopic graphene oxide (GO) fibers from a dispersion of GO in aqueous media can yield graphene fibers upon reduction, what is even more attractive is that it does not require graphene as an additive element to break through this limit described by transformation from 2D graphene to 3D graphite-like structure, and ultimately form an ordered assembly in graphite-like fiber structure (FIG. 7B). By the LV-NFEMS process, an aligned orientation can be directed under applied voltage to form a partially untangled chain structure in the use of transmission electron microscopy (TEM) to characterize PAN-based fibers (FIG. 7C). In contrast, lower voltage meaning lower polymer fiber diameter (FIG. 3B) leads to retaining the traditional unordered morphology of the polymer chains, which suggests that the applied voltage is critical for the ability to untangle the molecular chains. In one embodiment, once pyrolyzed at 1000° C., thermal treatment breaks the untangled chains at the edge of as-spun PAN-based fiber (FIGS. 7C and 7D), but more importantly causes the entangled polymer molecules chains to transform into the untangled carbon molecules chains (FIG. 7A). It is worth mentioning that the carbon nanowire (42.2 nm diameter) with core-shell structure having a graphitic shell with a glassy carbon core was fabricated by pyrolysis of basic material-SUB, thus resulting in relatively higher electrical conductivity than glassy carbon. The resulting comparison with the ordered carbon fibers (FIG. 7B) demonstrates the dependence of the graphitization degree on fiber diameter, igniting hope for higher conductivity.

FIGS. 8A-8E illustrate ultrathin pyrolyzed carbon nanofibers according to one or more embodiments. FIG. 8A-8E are TEM views of an exemplary embodiment of an ultrathin pyrolyzed carbon nanofiber 706. FIG. 8A is a low magnification TEM view of the exemplary embodiment of an ultrathin pyrolyzed carbon nanofiber 706 produced from a LV-NFEMS polymer 705 generated at an applied voltage of 35 V. FIG. 8B is a medium magnification TEM view of the exemplary embodiment of an ultrathin pyrolyzed carbon nanofiber 706. FIGS. 8C, 8D-8E are high magnification TEM views of the exemplary embodiment of an ultrathin pyrolyzed carbon nanofiber 706.

FIGS. 9A-9D illustrate suspended nanofibers according to one or more embodiments. According to one embodiment, one or more pyrolysis operations may be performed for heat treatment of carbon nanostrucures. FIGS. 9A-9D different heat treatment effects on a suspended fibers and nanofiber uniformity. FIG. 9A is a perspective view of an exemplary embodiment of aligned and suspended nanofibers 190 before pyrolysis. FIG. 9B is a perspective view of an exemplary embodiment of the nanofibers 190 of FIG. 9A after pyrolysis, wherein FIG. 9B depicts the dipping behavior of the final carbon fibers 191 in absence of stabilization. FIG. 9C is a perspective view of an exemplary embodiment of the buckling phenomenon of the nanofibers 190 of FIG. 9A after stabilization at 260° C., thereby producing buckled fibers 192. FIG. 9D is a perspective view of an exemplary embodiment of the fractured carbon fibers 193 obtained from the pyrolysis of the buckled fibers 192 of FIG. 9C, wherein the pyrolysis is performed at a ramp rate of 2.5° C./min up to 1000° C. In one embodiment, the unconventional heat treatment of the polymer nanofibers 190 in air at 115° C. ~120° C. for 20 hours improves the tensile strength of polymer nanofiber 190 by uncoiling and stabilizing the polymer chain backbone, preventing C—C bond cleavage through pyrolysis. In one embodiment, direct pyrolysis without stabilization yields fibers 191 dipping into the channel due to fiber elongation in the axial direction (FIG. 9B). In one embodiment, subsequent shrinkage of the highly aligned fibers 190 over the channel (FIG. 9A) during pyrolysis is greater than the shrinkage confined by the walls of the carbon posts 174, which causes the straight fibers to become bent and dip towards the bottom of silicon substrate 170.

In one embodiment, traditional heat treatment at 260° C. crosslinks the PAN molecular chains but causes the suspended fibers 190 to bend and deform (FIG. 9C), resulting in buckled fibers 192. In one embodiment, upon pyrolysis, the nanofibers 190 no longer remain suspended across the channel (FIG. 9D), resulting in fractured fibers 193. The resulting comparison of stabilized nanofibers 191, 192, and 193 at different temperatures indicates that the fibers heated at a lower temperature in air may develop lower shrink if restrained at a constant length, in one embodiment.

Exemplary Results

Figure 10E:
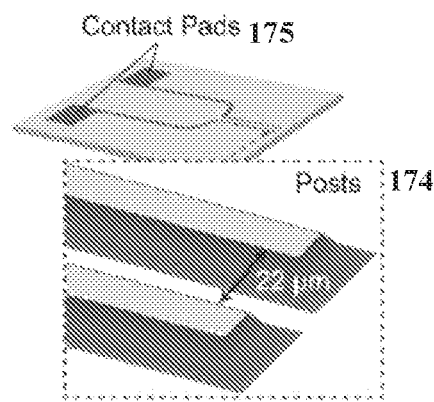
Figure 10F:
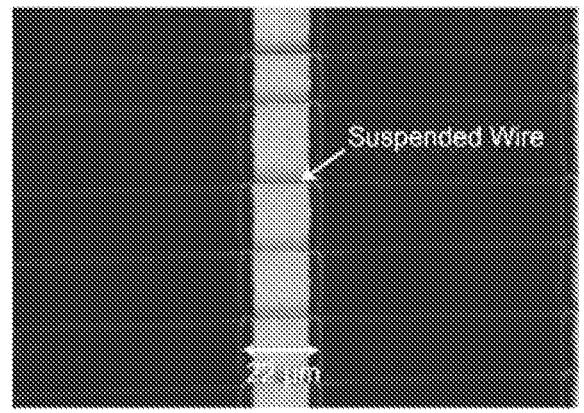

FIG. 10A illustrates a test system of a single carbon nanofiber 195 with a diameter of about 20 nm. FIG. 10B is a graph depicting a representative current-voltage (I-V) curve of the test system of FIG. 10A. FIG. 10C is a perspective view of an exemplary embodiment of a test system of a single carbon nanofiber 195 with a diameter of ~2-5 nm. FIG. 10D is a graph depicting a representative I-V curve of the test system of FIG. 10C. FIG. 10E is a perspective view of another exemplary embodiment of the test system of FIG. 10A, wherein the test system includes contact pads 175. FIG. 10F is a TEM image of the test system of FIG. 10E. Table 1 shows the relationship between fiber material, average fiber diameter, and conductivity, according to an exemplary embodiment.

For nanoelectronic applications, the electrical properties of ultra-thin carbon fibers are critical. To measure the intrinsic conductivity of single or multiple carbon nanofibers by an impedance analyzer, it may be necessary to establish a corresponding measurement system based on the chosen manufacturing characteristics. According to one embodiment, analysis can include adjusting the synthesized conditions of suspended carbon nanofibers 195. In accordance with the manufacturing process in FIGS. 9A, 9C and 9D, the resulting TEM image subsequently confirms the survival of only one suspended fiber 195 with ~20 nm diameter and ~22 µm length (FIG. 10A). Then, in one embodiment, the prepared carbon electrode scaffold 174 with suspended carbon nanofiber 195 is coated with silver paste 176 prior to connecting the copper clip attached to the impedance analyzer to the carbon electrode scaffold 174 surface. In the condition of the survival of only one suspended fiber or the absence of fiber, one embodiment compares the corresponding electrical conductivity values as obtained from the slope of Voltage-Current curves (FIG. 10B), demonstrating the reliability of the chosen measurement system. The conductivity of the single carbon fiber 195 is more than three times that of glassy carbon fiber in FIG. 10B, which most likely is attributed to the untangled molecules chains. The data in Table 1 shows that the reduction in diameter enhances the conductivity of carbon fibers so that the conductivity of the produced ultra-thin carbon fiber 195 is more than that of graphene fiber. In one embodiment, the LV-NFEMS process and subsequent pyrolysis are capable of producing nanofibers with a diameter as low as 2 nm.

TABLE 1

| Sample | Average diameter of fiber (nm) | Conductivity (S/m) |
|---|---|---|
| Glassy carbon fiber | 198 | $1.84 \times 10^3$ |
| Single carbon fiber in this work | 20 | $5.78 \times 10^3$ |
| Graphene fiber | 423 | $2.21 \times 10^5$ |
| Ultra-thin carbon fiber in this work | 5 | $3.64 \times 10^5$ |

In one embodiment, nanofibers at the scale of 2-5 nm are comprised of multiple planes of single-layer graphene. In one embodiment, the suspended carbon nanowire 195 exhibits ultrahigh electrical conductivities. In one embodiment, an I-V is performed by connecting the electrodes to the carbon posts 174, forming a complete circuit through the suspended nanowires 195. In one embodiment, the conductivity is calculated from the total resistance.

FIG. 10E is a perspective view of an exemplary embodiment of a carbon scaffold for creating tension during pyrolysis and for ohmic contact. In one embodiment, using the carbon scaffolds 174 for contact, groups of up to twenty parallel nanofibers 195 with a common length of ~20 µm were used to measure resistance from I-V curves.

Figure 11:
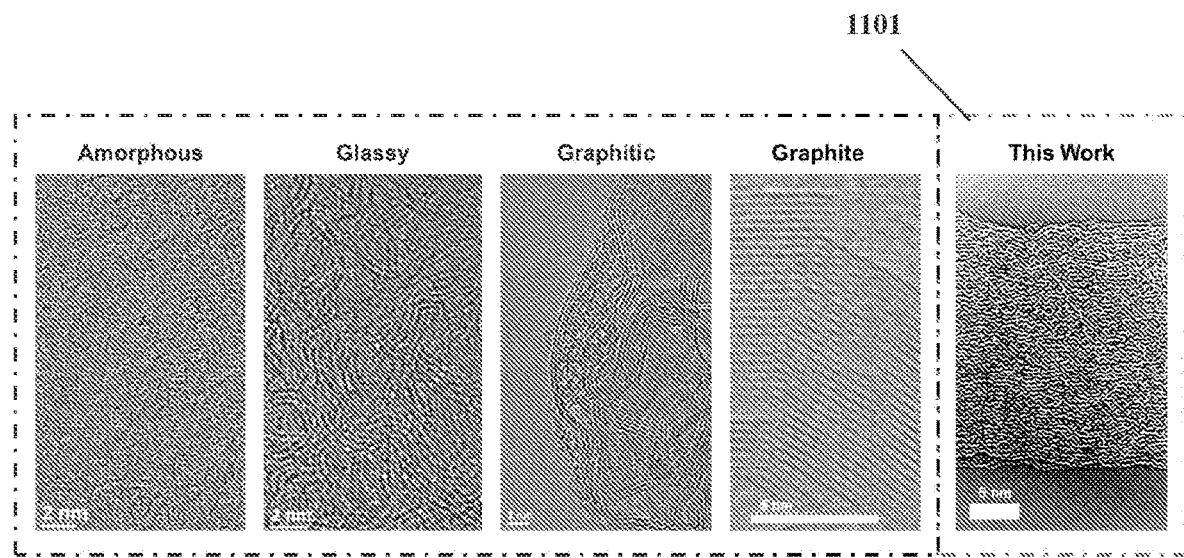
FIG. 11 depicts embodiments of carbon crystallinity according to one or more embodiments.

FIG. 11 depicts embodiments of carbon crystallinity according to one or more embodiments. FIG. 11 shows a plurality of TEM images depicting exemplary materials of various carbon crystallinity. Image 1101 illustrates a TEM image of a fabricated material produced by one or more embodiments described herein. As shown in FIG. 11, image 1101 illustrates untangling or untwisting of polymer chains in the polymer fibers after pyrolysis which results in highly crystalline carbon fibers.

Figure 12A:
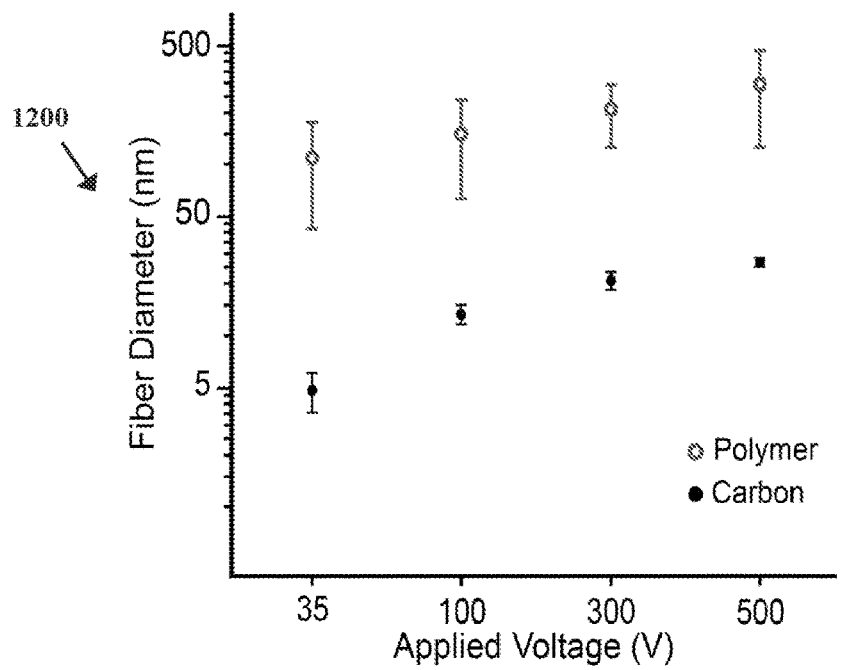
FIG. 12A depicts fiber diameter and electrospinning voltage according to one or more embodiments.

FIG. 12A depicts fiber diameter and electrospinning voltage according to one or more embodiments. In FIG. 12A, graph 1200 shows the relationship between fiber diameter and electrospinning voltage. In one embodiment, during conversion from polymer to carbon the suspended wires 195 shrink by a factor of 25 (represented by a change from open dots to solid dots in FIG. 12A), confining the remaining uncoiled polymer chains to self-assemble into axially aligned turbostratic graphene. FIG. 12A also illustrates that a substantially lower voltage can be used for fabrication of a carbon nanostructure.

Figure 12B:
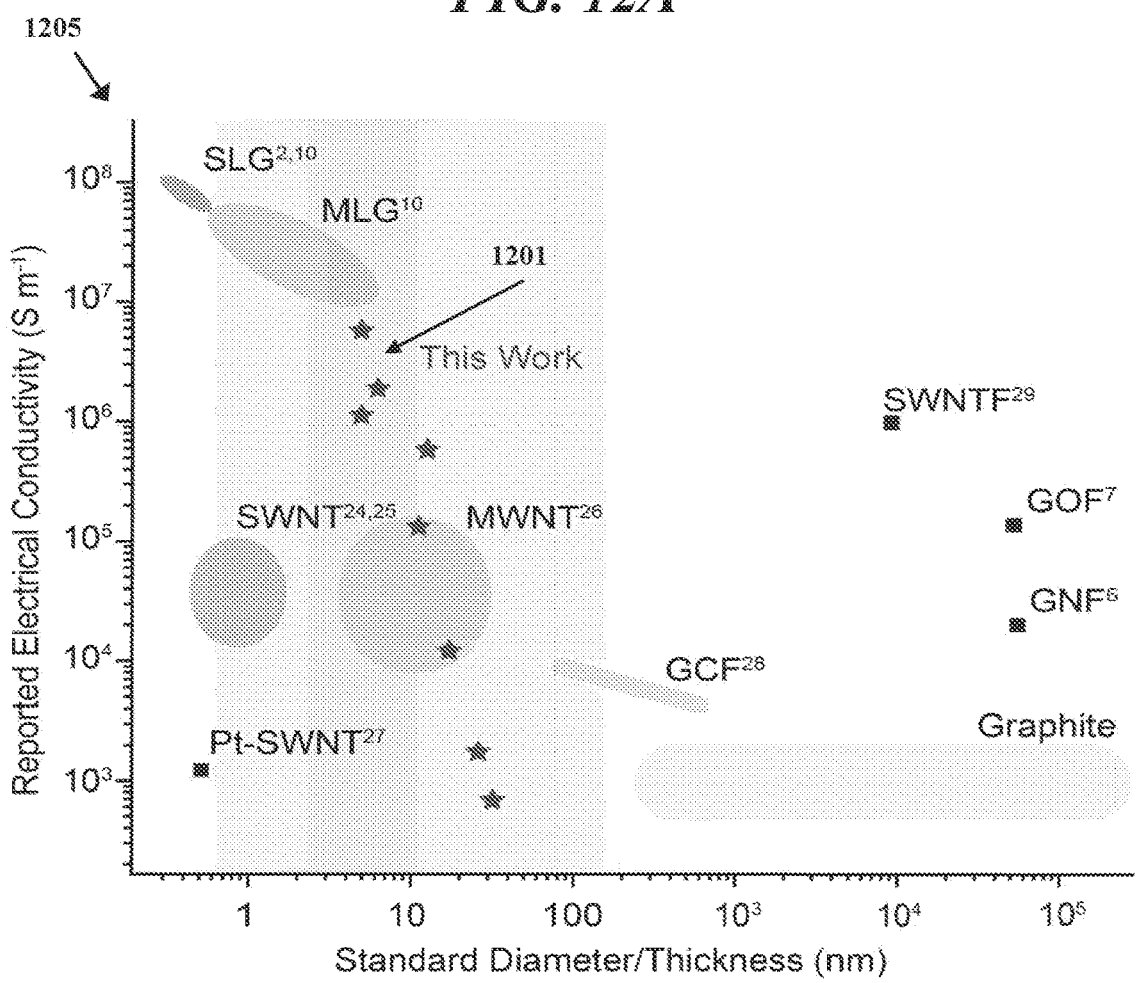
FIG. 12B depicts fiber diameter and electrical conductivity for a plurality of materials according to one or more embodiments.

FIG. 12B shows graph 1205 depicting the relationship between fiber diameter and electrical conductivity for a plurality of materials. Using conservative average values for the diameters of the suspended wires 195 in one embodiment, the conductivity data as a function of diameter are shown. The electrical conductivities of the ultrathin suspended carbon fibers 195 obtained with the LV-NFEMS process (represented as stars in FIG. 12B) are compared here with those of other forms of carbon. In one embodiment, with a diameter in the range of multiwall carbon nanotubes, the ultra-thin carbon fibers 195 from the LV-NFEMS process feature a conductivity that is higher than that of graphene fibers that are 50 μm thick without the need for additional temperature processing above 1000° C.

FIG. 12B illustrates exemplary values, shown generally by stars and results 1201 for embodiments described herein having reduced standard diameters/thickness compared to other materials and in the nm range with increased electrical conductivity. Accordingly, system configurations and processes described herein fabricate materials with improved properties and advance the fabrication processes compared to existing methods.

Methods for Electrical Resistance Measurements and Conductivity Calculations

In one embodiment of a measurement procedure, electrical conductivity, σ [S m$^{-1}$], is calculated by measuring total resistance across the carbon nanowire 195. In one embodiment, the conductivity (I-V) is measured using a potentiostat (VersaSTAT 4, Ametek Scientific Instruments) with a two-electrode system (−0.01 V to 0.01 V, sweep rate=0.001 V/s). In one embodiment of a measurement procedure, each carbon post 174 serves as an electrode and is physically contacted using a single-sided microalligator clip. In one embodiment of a measurement procedure, in the case of poor physical contact between the clip and carbon post 174, a small amount of carbon paste is added to the outer edge of the carbon post 174. In one embodiment of a measurement procedure, the conductivity is estimated from the slope (resistance) of the I-V curve. In one embodiment of a measurement procedure, after the I-V curve is obtained, the suspended nanowires 195 are removed from the two carbon posts 174 using high-pressure air and retested to verify the obtained signal was from the nanowires 195.

Several assumptions and considerations were required when calculating conductivity due to inability to characterize the as-fabricated sub-5-nm nanowires 195, according to one embodiment of a measurement procedure. In one embodiment of a measurement procedure, the conductivity equation used is $$\sigma = \frac{L}{nAR}$$

where L is the length of the nanowire, n is the number of nanowires, A is the cross-sectional area of the nanowire, and R is measured resistance. In one embodiment of a measurement procedure, nanowire length (L) is given by the distance of the channel separating the two carbon posts 174 (22 μm). In one embodiment of a measurement procedure, the number of nanowires (n) before pyrolysis was used for calculations. In one embodiment of a measurement procedure, the assumption that all nanowires 195 survived the pyrolysis process results in a lower reported electrical conductivity. In one embodiment of a measurement procedure, the fiber 195 uniformity is assumed to be a perfect rod with a cross-sectional area of a circle. In one embodiment of a measurement procedure, the radius used for calculating area (A) are averaged from measured diameters of TEM images. The measured diameters may range from 5-10 nm, 10-20 nm, 20-30 nm, and 30-40 nm for nanowires 190 obtained from an electrospinning voltage of 35 V, 100 V, 300 V, and 500 V, respectively. In one embodiment of a measurement procedure, errors associated with the calculations are recognized—in turn, conservatively estimated electrical conductivities are reported. In one embodiment of a measurement procedure, if estimates were to be calculated from fewer number of nanowires and minimum observed diameters, the reported electrical conductivities would be much greater.

Methods for Electron Microscopy

In one embodiment of a measurement procedure, TEM samples are made by drop-casting a dispersion of carbon nanowires 195 onto copper grids and imaged using a JEOL 2800 TEM at 200 kV. In one embodiment of a measurement procedure, the suspended carbon nanowires 195 on the silicon chips 170 are submerged into a vial containing isopropanol then placed into an ultrasonic bath at 45° C. for 1.3 hours. In one embodiment of a measurement procedure, the solution is drop-cast onto a copper grid.

While this disclosure has been particularly shown and described with references to exemplary embodiments thereof, it will be understood by those skilled in the art that various changes in form and details may be made therein without departing from the scope of the claimed embodiments.

What is claimed is:

1. A system for producing a carbon nanostructure by low voltage near-field electromechanical spinning (LV-NFEMS), the system including:
    an injector configured to output a polymer solution to an extruder tip, the injector including an absorbent band to control curvature of a polymer solution droplet of the extruder tip, wherein the polymer solution is a single polymer and the absorbent band is a paper band configured to wick excess polymer solution from the extruder tip;
    a collector drum configured to rotate;
    a voltage source configured to apply voltage to the extruder tip and the collector drum; and
    a stage configured to position the extruder tip relative to the collector drum,
    wherein the extruder tip is positioned toward the collector drum to form a sustained jet of the polymer solution with the collector, and
    wherein the stage is configured to move relative to the collector to form a carbon nanostructure.

2. The system of claim 1, wherein the collector is configured to support at least one substrate to receive the carbon nanostructure, and wherein the collector and injector are configured to pull and thin the carbon nanostructure.

3. The system of claim 1, wherein the voltage source is configured to control meniscus curvature of the droplet of the extruder tip as a function of the applied voltage, and wherein the voltage source is a low voltage source.

4. The system of claim 1, wherein the sustained jet is initiated by direct contact of the polymer solution droplet to the collector to form a liquid bridge, and wherein the droplet and sustained jet are retracted to a first distance following formation of the liquid bridge.

5. The system of claim 1, wherein the carbon nanostructure is an ultra-thin carbon fiber having a diameter of about 2 to 5 nanometers (nm).

6. The system of claim 1, wherein the carbon nanostructure is applied to a carbon electrode scaffold.

7. The system of claim 1, wherein rotating velocity of the collector is matched to velocity of the sustained jet of the polymer solution.

8. The system of claim 1, wherein the polymer solution includes polyacrylonitrile (PAN) and dimethylformamide (DMF).

9. The system of claim 1, wherein the stage is configured to move droplet output by the injector.

10. A method for producing a carbon nanostructure by low voltage near-field electromechanical spinning (LV-NFEMS), the method comprising:
   outputting, by an injector, a polymer solution to an extruder tip, wherein the injector including an absorbent band to control curvature of a polymer solution droplet of the extruder tip;
   rotating a collector drum;
   applying, by a voltage source, voltage to the extruder tip and the collector drum; and
   positioning, by a stage, the extruder tip relative to the collector drum,
   wherein the extruder tip is positioned toward the collector drum to form a sustained jet of the polymer solution with the collector, and
   wherein the stage is configured to move relative to the collector to form a carbon nanostructure wherein the polymer solution is a single polymer and the absorbent band is a paper band configured to wick excess polymer solution from the extruder tip.

11. The method of claim 10, wherein the collector is configured to support at least one substrate to receive the carbon nanostructure, and wherein the collector and injector are configured to pull and thin the carbon nanostructure.

12. The method of claim 10, wherein voltage source is configured to control meniscus curvature of the droplet of the extruder tip as a function of the applied voltage, and wherein the voltage source is a low voltage source.

13. The method of claim 10, wherein the sustained jet is initiated by direct contact of the polymer solution droplet to the collector to form a liquid bridge, and wherein the droplet and sustained jet are retracted to a first distance following formation of the liquid bridge.

14. The method of claim 10, wherein carbon nanostructure is an ultra-thin carbon fiber having a diameter of about 2 to 5 nanometers (nm).

15. The method of claim 10, wherein the carbon nanostructure is applied to a carbon electrode scaffold.

16. The method of claim 10, wherein rotating velocity of the collector and is matched to velocity of the sustained jet of polymer solution.

17. The method of claim 10, wherein the polymer solution includes polyacrylonitrile (PAN) and dimethylformamide (DMF).

18. The method of claim 10, further comprising pyrolizing the carbon nanostructure.

* * * * *